United States Patent [19]

Rembaum et al.

[11] 4,170,685
[45] Oct. 9, 1979

[54] POLYVINYL PYRIDINE MICROSPHERES

[75] Inventors: Alan Rembaum, Altadena; Amitava Gupta, Los Angeles; Willi Volksen, Pasadena, all of Calif.

[73] Assignee: California Institute of Technology, Pasadena, Calif.

[21] Appl. No.: 780,007

[22] Filed: Mar. 22, 1977

Related U.S. Application Data

[63] Continuation-in-part of Ser. No. 671,058, Mar. 29, 1976, abandoned.

[51] Int. Cl.² .............. B32B 5/16; C08J 9/00; C08F 8/00; C08F 2/46
[52] U.S. Cl. .................. 428/402; 526/265; 204/159.22; 204/159.15; 428/407; 260/42.44
[58] Field of Search ............ 428/372, 402, 406, 407, 428/403, 431, 441; 204/159.22, 159.15; 260/2.5 B; 526/265

[56] References Cited

U.S. PATENT DOCUMENTS

| | | | |
|---|---|---|---|
| 3,288,765 | 11/1966 | Novak et al. | 526/265 X |
| 3,507,846 | 4/1970 | Haas | 526/265 X |
| 3,767,600 | 10/1973 | Albright | 260/2.5 B X |
| 3,854,982 | 12/1974 | Aelion et al. | 204/159.22 X |
| 3,862,924 | 1/1975 | Hamann et al. | 526/265 X |
| 3,943,045 | 3/1976 | Cordrey et al. | 204/159.22 |
| 3,947,526 | 3/1976 | Bacskai | 526/265 X |
| 3,957,741 | 5/1976 | Rembaum et al. | 260/2.5 B X |
| 4,035,316 | 7/1977 | Yen et al. | 260/2.5 B |
| 4,039,331 | 8/1977 | Lee | 428/407 X |
| 4,046,720 | 9/1977 | Rembaum et al. | 204/159.15 X |

*Primary Examiner*—George F. Lesmes
*Assistant Examiner*—D. R. Zirker
*Attorney, Agent, or Firm*—Marvin E. Jacobs

[57] ABSTRACT

Microspheres are produced by cobalt gamma radiation initiated polymerization of a dilute aqueous vinyl pyridine solution. Addition of cross-linking agent provides higher surface area beads. Addition of monomers such as hydroxyethylmethacrylate acrylamide or methacrylamide increases hydrophilic properties and surface area of the beads. High surface area catalytic supports are formed in the presence of controlled pore glass substrate.

4 Claims, 3 Drawing Figures a# POLYVINYL PYRIDINE MICROSPHERES

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

CROSS-REFERENCE TO RELATED APPLICATION

This invention is a continuation-in-part of an application Ser. No. 671,058 filed Mar. 29, 1976, now abandoned.

BACKGROUND OF THE INVENTION

1. Field of the Invention

The present invention relates to polymeric microspheres, particularly vinyl pyridine microspheres, and to methods of making the microspheres.

2. Description of the Prior Art

It has not been possible so far to produce polyvinyl pyridine microspheres of selected size and high purity from emulsion polymerization systems and the particles tend to agglomerate. Furthermore, the recovered particles are contaminated with impurities from the polymerization system which renders them unsuitable for many uses. The particles are generally hydrophobic in character and have relatively low surface area.

SUMMARY OF THE INVENTION

Suspensions of polyvinyl pyridine microspheres having a selected uniform diameter below 100 microns and preferably from 100 Å to 100,000 Å are provided in accordance with the invention. The standard deviation of the diameter of the microspheres was found to be of the order of 3 to 10%. The surface area of the microspheres can be considerably varied and adhesiveness is lower providing unagglomerated particles. The microspheres have exceptional purity since the polymerization system is free of initiator and emulsifier.

The microspheres are produced by applying ionizing radiation, from a suitable cobalt gamma source to a solution of vinyl pyridine in aqueous media. The microspheres can be separated by freeze drying or centrifugation of the resulting microsphere suspension. The vinyl pyridine monomer has exceptional resistance to the high energy radiation. Thus, overdoses of radiation do not degrade the microspheres and the microspheres are useful in radiation environments such as a radiation barrier material.

Hydrophilic characteristics are provided by addition of a suitable unsaturated comonomer and surface area is varied by addition of cross-linking agent or comonomer. Solubility of the monomers can be increased by addition of a water-miscible solvent such as an alkanol, suitably methanol or a ketone such as acetone. Optionally a small amount of stabilizer may be present.

Substrates, especially those having electronegative surfaces can be coded by applying the suspension of microspheres to the surface and removing the liquid. Quaternization of the nitrogens in the pyridine rings provide particles suitable for applications involving ion exchange. The modified particles can be used in the form of affinity chromatography columns for the separation of a variety of materials, specifically proteins, aldehydes and ketones. The high radiation resistance of the particles makes them suitable for application in nuclear technology and when quaternized with acids or halogen compounds, aqueous emulsions of the microspheres should find applications in biocidal preparations.

The high surface area films or microsphere agglomerates are useful as substrates for binding metal catalysts. The metal may be in the form of fine particles encapsulated in the microspheres by conducting the polymerization in presence of finely divided metal as disclosed in copending application Ser. No. 694,151 filed June 9, 1976, now abandoned. The tertiary amine functionality of the pendant pyridine group may be utilized to bind catalytic metal salts. In copending application Ser. No. 718,103 filed Aug. 27, 1976, the microsphere is impregnated with a metal salt which is then reduced to form finely divided black metal particles formed in situ within the microsphere.

Photoactivated polymer supported catalysts are disclosed in Ser. No. 666,184 filed Mar. 12, 1976, now abandoned and in a continuation-in-part application, Ser. No. 764,402, filed Jan. 31, 1977. The catalysts are prepared by photoirradiation of polyvinyl pyridine microspheres in presence of low valent transition metals such as $Rh_4(CO)_{12}$, $Ru_3(CO)_{12}$ or $Co_2(CO)_8$. The catalysts are useful in addition reactions such as hydroformylation of olefins to aldehydes.

The addition reaction may be conducted in the presence or absence of light. The yield of addition product increase dramatically when the surface area is increased preferably by depositing the polymer on porous, inert, finely divided substrates such as glass beads having a diameter below 1000 microns, preferably 10 to 150 microns, and pores from 50 to 500 nm, preferably no more than 150 nm. Catalytic activity for the photoactivated catalyst is also strongly dependent on the polymer-glass ratio and yields are maximized when the polymer-glass ratio is from 1 to 40% by weight, preferably from 5 to 20% by weight.

These and many other features and attendant advantages of the invention will become apparent as the invention becomes better understood by reference to the following detailed description when considered in conjunction with the accompanying drawings.

DESCRIPTION OF THE PREFERRED EMBODIMENTS

Figure 1:
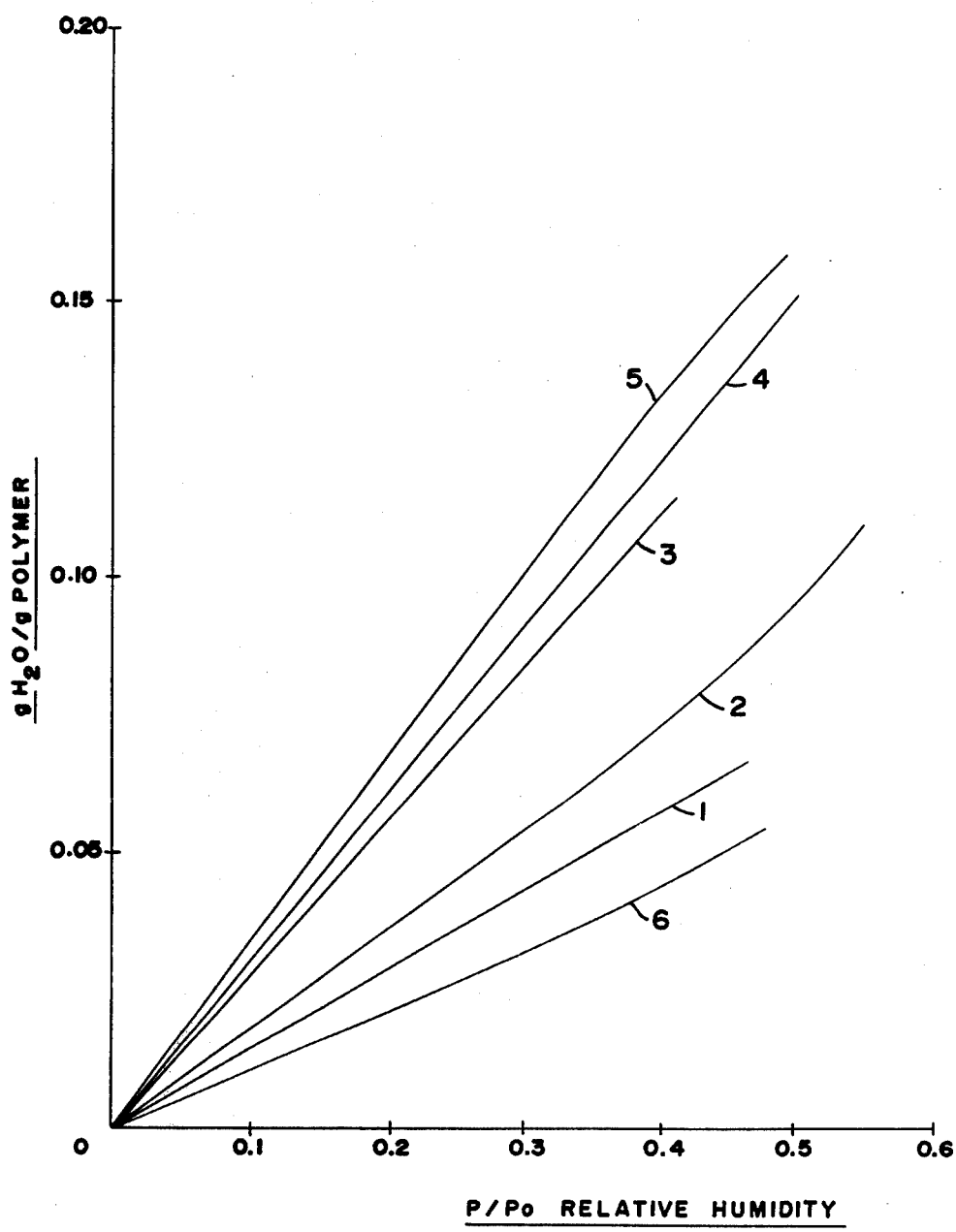
FIG. 1 is a series of graphs of water absorption isotherms at room temperature with water absorption (g $H_2O$/g polymer) as ordinate and relative humidity ($P/P_0 \times 10^{-2}$) as abscissa. The circled numbers refer to the examples of Table II.

The monomer mixture contains at least 20% by weight of vinyl pyridine, preferably at least 50% by weight, optimally about 70% to 80% by weight. The remaining comonomers are soluble in the aqueous medium, compatible, unsaturated compounds capable of addition polymerization with vinyl pyridine. The comonomers preferably contain a hydrophilic group such as carboxyl, amino or hydroxyl.

Mono-unsaturated comonomers are suitably selected from amino, carboxyl or hydroxyl substituted acrylic monomers. Exemplary comonomers are acrylamide (AM), methacrylamide (MAM), acrylic acid, methacrylic acid (MA), dimethylaminomethacrylate or hydroxyl-lower alkyl- or amino-lower-alkyl-acrylates such as those of the formula:

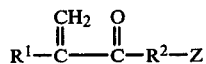

where $R^1$ is hydrogen or lower alkyl of 1–8 carbon atoms, $R^2$ is alkylene of 1–12 carbon atoms, and Z is —OH or $R_3$—N—$R_4$ where $R^3$ or $R^4$ are individually selected from H, lower alkyl or lower alkoxy of 1–8 carbon atoms. 2-hydroxyethyl methacrylate (HEMA), 3-hydroxypropyl methacrylate and 2-aminoethyl methacrylate are readily available commercially. Surface area and hydrophilicity increase with increasing concentration of comonomer or water soluble cross-linking agent.

Polyunsaturated compounds also provide higher surface area and hydrophilicity and additionally provide cross-linked beads which are more regular in shape and less likely to agglomerate. Polyunsaturated compounds, a diene or triene polyvinyl compound, compounds having low water solubility such as ethylene glycol dimethacrylate or trimethylol propane trimethacrylate reduce surface area and hydrophilicity. However, water soluble compounds such as N,N-methylene-bis-acrylamide (BAM) or hexahydro-1,3,5-triacryloyl-s-triazine increase surface area and hydrophilicity.

Vinyl pyridines suitable for use in the invention are 2-vinyl pyridine, 4-vinyl pyridine and 2-methyl-5-vinyl pyridine. 2-vinyl pyridine has, in general, been found to produce smaller beads, more resistant to agglomeration even in the absence of cross-linking agents and suspending agents.

The addition of 0.05 to 5% by weight of a stabilizing agent to the aqueous polymerization system before polymerization is found to further reduce agglomeration. The stabilizing agent is suitably an aqueous soluble polymer such as a polyalkylene oxide polyether or non-ionic surfactants such as Tween which are polyoxyethylene derivatives of fatty acid partial esters of sorbitol. The polyethers generally have a molecular weight from 1,000 to 10,000,000, preferably 200,000 to 1,000,000 and are polymers of ethylene oxide, propylene oxide or their mixtures. Polyethylene oxides (PEO) are preferred. Polymerization also proceeds in the presence of cationic or anionic surfactants.

The polymerization proceeds without catalyst and with or without stirring with application of high energy radiation capable of generating free radicals to the aqueous system. The radiation source is suitably a cobalt 60 gamma source and doses of 0.5 to 1.0 megarads are sufficient for polymerization. Increased radiation dose up to about 4 megarads or more in absence of cross-linking agent reduces agglomeration and improves the shape of the beads. The reaction is preferably conducted under oxygen excluding condition, generally by applying vacuum to the reaction vessel or by displacing oxygen from the system with an inert gas such as nitrogen. After polymerization has proceeded to completion, the polymerization suspension is centrifuged, washed and the trapped water is then removed by azeotropic distillation or freeze drying to yield white, round microspheres at least 80% of which and preferably 90% of which have an average diameter of less than 100 microns, preferably from 100 Å to 60 microns and a standard deviation in most cases of no more than 3–40%.

The microspheres can be deposited on a substrate such as a planar surface or particulate surface such as glass beads or polymerized in situ in the presence of the substrate to form a coated substrate. The coating consists of a high concentration of microspheres.

The size of the microspheres is dependent on monomer concentration. The vinyl pyridine monomers are soluble in water up to about 3%. Polymerization in presence of water miscible solvents permits increased water solubility of vinyl pyridine or comonomer mixtures 6–10% or more. Microspheres produced at 3% vinyl pyridine monomer concentration or less will have a diameter below 3500 Å. Solubility of the vinyl pyridine is increased by the addition of a water-miscible solvent therefor such as by replacing up to 50% by weight of the water with a lower alkanol or di or trialkanol such as methanol. The polymerization rate is considerably decreased requiring irradiation of the solution for a longer period.

Examples of practice follow.

4- and 2-vinyl pyridine were polymerized with or without various cross-linking agents in presence of water using Co-60 gamma radiation. The polymer was obtained in the form of microspheres whose average diameter depended on the initial concentration of the monomer (Table I). It was found that presence of cross-linking agents made the beads less likely to agglomerate. Agglomeration and size of the beads were reduced on adding 0.4% polyethylene oxide having molecular weight of 200,000 to 6,000,000 to the solution before polymerization.

TABLE I

| Conc. of 4-VP[a] wt/wt % | Wt by Wt Ratio of BAM[b] to 4-VP | Monomer Conc. % by Wt | Size of Beads[c] |
|---|---|---|---|
| 0.225 | 1:9 | 0.25 | 900A |
| 0.45 | 1:9 | 0.50 | 950A |
| 0.90 | 1:9 | 1.00 | 1300A |
| 1.35 | 1:9 | 1.50 | 1600A |
| 1.80 | 1:9 | 2.00 | 1600A |
| 2.25 | 1:9 | 2.50 | 1600A |
| 2.7 | 1:9 | 3.00 | 2500A |

[a] Vacuum distilled from solid KOH; polymerization carried out in degassed solution.
[b] Bis acrylamide
[c] Obtained by scanning electron microscopy; average size obtained by taking the mean of 12–20 particles.

Similar results were obtained using ethylene glycol dimethacrylate in place of BAM except that the size of the beads was smaller. The polymers were centrifuged, washed in benzene and then the trapped water was removed by azeotropic distillation using benzene. They were then dried in vacuo for 24 hours, washed again in benzene and dried again for 24 hours to yield a white powder.

2-vinyl pyridine was also polymerized on porous glass beads, obtained from Corning Glass Company. These beads were 20–50μ in diameter and had pores of diameter 150 nm. The glass beads were stirred in the presence of 2-vinyl pyridine for several hours and then wetted with water before being irradiated by Co-60 γ rays. It was found that presence of water was essential for appreciable polymerization to occur via this technique. SEM pictures show that the glass chips were well covered with polymer and the weight percent of polymer incorporated in the chips was obtained by thermogravimetric analysis. The ratio of weight of incorporated polymer to the weight of chips varied from 0.3:1 to 0.5:1. For successful use as a catalyst support system complete coverage of the glass surface by polymers is desirable, since the glass surface is acidic and could destroy catalytic species in contact with it. These were dried as described above.

Microspheres of differing surface area were synthesized by varying the amount of cross-linking agent in a 3% total monomer aqueous system containing 4-vinyl pyridine (4-VP) and bis acrylamide (BAM) and subjected to a 0.6 megarad dose of radiation.

Commercial poly-4-VP was dissolved in dichloromethane and precipitated in benzene twice and dried as described above. The surface area of the microspheres was determined by the BET method and standard deviation of size was ±10%. Results follow:

TABLE II

| Example | [M]* | 4-VP, wt % | Surface area, $m^2/g$ | Diameter.A |
|---|---|---|---|---|
| 1 | 3 | 95 | 1 | 2500 |
| 2 | 3 | 85 | 1 | 2500 |
| 3 | 3 | 70 | 1.01 | 2500 |
| 4 | 3 | 60 | 47.0 | 2500 |
| 5 | 3 | 50 | 102.0 | 2500 |
| 6 | | Commercial Poly-4-VP | 0.3 | — |

*Total Monomer

The surface area dramatically increases with increasing amount of cross-linking agent as can be seen in Table II and water absorption also increases with increasing amount of hydrophilic cross-linking agent as shown in water isotherms shown in FIG. 1.

EXAMPLE 1

4-VP (2.7 g) and BAM (0.3 g) were dissolved in MeOH (30 cc) and distilled water (70 cc) containing 0.4 g of PEO (M.W. 400,000). Argon gas was bubbled through the mixture for five minutes and the mixture irradiated from a Co-γ 60 source for 16 hours in a closed container ($3.95 \times 10^5$ rad/hr.). The diameter of the beads obtained was $1.28\mu \pm 0.3$.

Effect of polyethylene oxide (PEO) molecular weight was determined by irradiating an aqueous solution containing 0.1% PEO and 3% total monomer (90% 4-VP, 10% BAM) with 1.2 megarads of radiation from a Co-60 gamma source. The results follow:

TABLE III

| PEO, MW | Bead Size, A |
|---|---|
| 4,000,000 | 2140 |
| 600,000 | 2330 |
| 300,00 | 2500 |
| 100,000 | 2650 |

The bead size is seen to increase monotonically with decreasing molecular weight of PEO.

Figure 2:
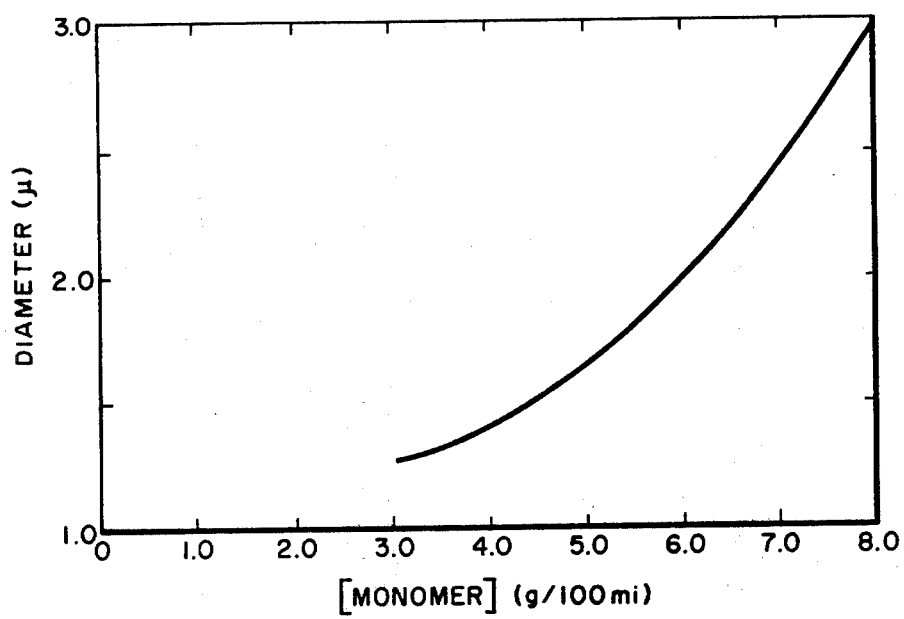
FIG. 2 is a graph of bead diameter in microns as ordinate vs monomer concentration as abscissa showing the effect of monomer concentration.

The effect of monomer concentration on particle size was studied by varying monomer concentration of a 90% 4-VP, 10% BAM monomer mixture from 3–8% in 30% MeOH/water solvent containing 0.4% PEO. The radiation dose was 1.2 megarads from a Co-60 gamma source. The particle size increased up to 3 microns as shown in FIG. 2.

In these experiments a marked improvement of size distribution was obtained when the pH of the polymerization mixture was lowered from a pH of 9.7 to 7.2. At the pH of 7.2 the beads had a diameter of $1.2\mu$ and the standard deviation was less than 4%.

Figure 3:
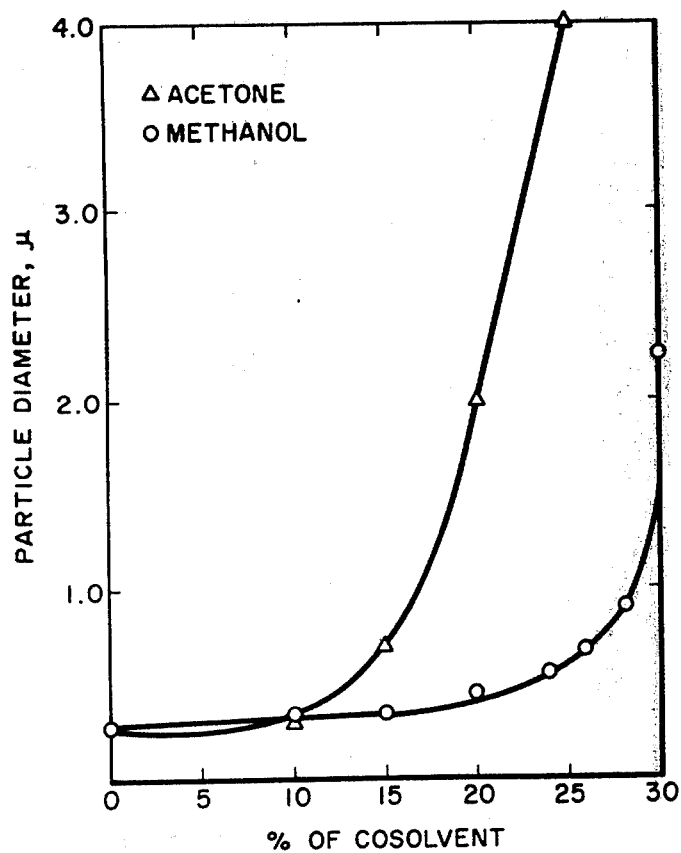
FIG. 3 is a set of graphs of bead diameter in microns as ordinate vs volume % of cosolvent as abscissa showing the effect of acetone or methanol solvent on particle size.

The effect of solvent concentration on particle size was investigated by varying methanol and acetone concentration from 0 to 30 ml/100 ml $H_2O$ in a solution containing 3% total monomer (90% 4-VP; 10% BAM/100 ml) and 0.4% PEO irradiated with 1.2 megarads from a Co-60 gamma source. The results illustrated in FIG. 3 show an increase in diameter of the beads with increasing solvent concentration, larger beads being produced in acetone at the same solvent concentration.

4-VP beads with up to 50% by weight of hydrophilic comonomer were prepared. Polyhema beads disclosed in copending application Ser. No. 634,935, filed Nov. 24, 1975 entitled "Preparation of Small Bio-Compatible Microspheres", the disclosure of which is expressly incorporated herein by reference, have been shown to be very useful for the specific binding of protein conjugates such as antibody or antigen by the glutaraldehyde or carbodiimide coupling reactions. The polyhema beads are soft swellable hydrophilic beads. Vinyl pyridine copolymer beads produced according to this invention will be harder and more durable since the polymerization in aqueous media will result in the formation of a hard cross-linked hydrophobic vinyl pyridine core with the orientation to the exterior of the bead of the hydrophilic hydroxyl or amino groups from the comonomer.

Copolymer beads were prepared by irradiation of an aqueous solution containing 2% total monomer including 4-VP, hydrophilic HEMA or AM comonomer and BAM cross-linking agent and 0.4% PEO with 1.2 megarads of Co-60 gamma radiation. The results are shown in the following table:

TABLE IV

| 4-VP | HEMA | AM | MAM | BAM | Particle Size (μ) |
|---|---|---|---|---|---|
| 80% | 10% | — | — | 10% | 0.18 μ |
| 70% | 20% | — | — | 10% | 0.15 μ |
| 60% | 30% | — | — | 10% | 0.18 μ |
| 70% | — | — | 20% | 10% | 0.18 μ |
| 60% | — | — | 30% | 10% | 0.19 μ |
| 40% | — | — | 50% | 10% | 0.25 μ |
| 80% | — | 10% | — | 10% | 0.16 μ |
| 70% | — | 20% | — | 10% | 0.17 μ |
| 60 | — | 30% | — | 10% | 0.18 μ |

Discrete, unagglomerated, spherical beads of uniform diameter having a hydrophilic sheath were produced.

1000 A beads of the following composition; vinyl pyridine (60%) acrylamide (30%) BAM (10%) were tested for capability of binding to antibodies. It was found that this type of beads did not exhibit non-specific binding to living cells e.g. murine lymphocytes.

Rh-PVP-glass supported catalysts are synthesized for batch reactor runs according to the following procedure:

1 g of poly-2-vinylpyridine is dissolved in 50 ml benzene and then filtered to remove insoluble impurities. The solution is added dropwise to 250 ml diethyl ether which is vigorously stirred at the same time. The polymer precipitates. It is settled, filtered and then dried. It may be redissolved in benzene and reprecipitated in ether. After drying, it is weighed. Yield on purification averages 60–90%. 25 g of pure polymer is dissolved in benzene (10 ml) and 2.5 g of ordinary glass powder or of controlled pore glass (CPG) are added to the solution. The solvent is driven off slowly, with stirring. The material is dried in vacuum at ~50° C. and analyzed by TGA.

100 mg of the polymer coated glass is taken in a clean quartz vessel, pumped in the vacuum line at 110° C. for 1 hour and then backfilled with $N_2$. 25 ml of a solution of $Rh_4(CO)_{12}$ in n-hexane (25 mg in 50 ml) is added to the polymer glass composite in the quartz vessel and a reservoir is attached to the vessel. The vessel and the reservoir are then put in the vacuum line and the contents are degassed over 3 cycles. The mixture is then irradiated with light from a Hanovia 450 watt lamp filtered through water for 16 hours with stirring. The mixture is then allowed to settle and the supernatent liquid withdrawn from the vessel under an inert gas. The solids are washed with fresh n-hexane in the vacuum line to remove unreacted $Rh_4(CO)_{12}$. Meanwhile 100 ml of a mixture of n-hexane and 1-pentene (95:5 v/v) is degassed in the line. The dark brown Rh-PVP-glass solid (8–10% by weight Rh on PVP) in the quartz vessel is then poured into a Parr pressure reactor whose temperature is maintained at 20° C. The hexane-alkene mixture is added and the reactor is filled with a $H_2/CO$ mixture (80:20 v/v) to 76 psig pressure. The reactor is stirred continuously and samples are withdrawn every two hours. The products are analyzed on a gas chromatography using a 6'×⅛" UCW-98 (5% on chrom W) column. The areas of the peaks are estimated by cutting and weighing. These are compared to calibration peak weights to determine molarity of the products. The concentration is then multiplied by the volume to obtain absolute yields and these are normalized for catalyst weight. The results are shown in the following table.

TABLE V

| Run No. | Diameter, Mesh | Pore Size, nm | Activity (Turnover number) |
|---|---|---|---|
| 1 | 20–80 | 150 | ~1/HR/Rh$_4$ |
| 2 | 200 | 120–135 | very good 3–10 times better than 1 |
| 3 | 200 | non-porous | polymer did not attach to substrate |

The above batch runs were repeated varying the ratio α, of polymer to glass from 0 to 100%. The catalytic activity is strongly dependent on polymer-glass ratio for the photoactivated catalyst. Furthermore, yield of addition product is higher when the polymer glass ratio is from 1 to 40% by weight, preferably from 5 to 20% by weight, optimally at about 10% by weight.

The vinyl pyridine microspheres are found to bind to dyes containing acidic groups such as sulfonic acid or carboxyl.

The hard, discrete PVP microspheres when bound to fluorescent dyes provide a brightly fluorescent dye-bead adduct very useful as a calibration standard for fluorescent microscopy, cell selection and cell counting instruments. Representative fluorescent dyes are fluorescein isothiocyanate (FITC) and rhodamine isothiocyanate. The dye is usually added in an amount between 1 to 30% of the beads by weight and the excess removed.

EXAMPLE 7

0.1 g of PVP microspheres (5μ in diameter) cross-linked with 10% BAM and suspended in 20 cc of $H_2O$ were mixed with FITC (0.1 g in acetone).

The mixture, after agitation for 30 minutes was centrifuged on a clinical centrifuge at 3000 rpm for 10 minutes. The supernatant was removed and the residue was washed three times with acetone and then resuspended in water. The PVP microspheres acquired a high intensity yellow fluorescence as observed in a fluorescent microscope.

EXAMPLE 8

The procedure of Example 7 was repeated substituting rhodamine isothiocyanate for FITC. High intensity red fluorescent microspheres were observed in the fluorescent microscope.

There is a need for a calibration standard to determine RNA or DNA content of fluorescent dye stained cells for automated cytology instruments. The PVP beads of the invention have been found to bind to RNA, DNA, viruses or bacteria which contain RNA and DNA and to fluorescent dyes such as ethidium bromide. Acid conditions are preferred to quaternize the pyridine nitrogen atoms on the surface of the beads. Fairly large beads of the order of 1 to 10 microns may be utilized.

EXAMPLE 9

5 microns PVP beads (50 mg) were agitated with 20 cc of $T_4$ virus ($10^{11}$/cc) for 30 minutes at pH 5. After purification by three washings with phosphate buffered saline (PBS), 10 cc of an ethidium bromide solution (5 mg/cc) was added to the beads and agitated for 30 minutes. After centrifugation and three washings with PBS, the beads exhibited a bright red fluorescence.

It is to be realized that only preferred embodiments of the invention have been described and that numerous substitutions, modifications and alterations are permissible without departing from the spirit and scope of the invention as defined in the following claims.

What is claimed is:

1. A composition consisting essentially of discrete beads, at least 80% of which have a uniform diameter from 100 A to 60 microns having a surface area of at least 1 m$^2$/g and consisting essentially of addition copolymerized monomer mixture containing 60 to 80% vinyl pyridine, 10 to 30% of an addition copolymerizable, water soluble, monounsaturated comonomer selected from acrylamide, methacrylamide, acrylic acid, methacrylic acid or compounds of the formula:

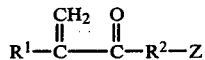

where $R^1$ is hydrogen or lower alkyl of 1–8 carbon atoms; $R^2$ is alkylene of 1–12 carbon atoms and Z is —OH or

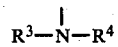

where $R^3$ or $R^4$ are individually selected from H, lower alkyl or lower alkoxy of 1–8 carbon atoms, and 5 to 30% of a water soluble, addition copolymerizable polyvinyl cross-linking agent said beads including a hard, cross-linked, hydrophobic vinyl pyridine copolymeric core and a hydrophilic, monounsaturated comonomer copolymeric sheath.

2. A composition according to claim 1 in which the cross-linking agent is selected from the group consisting of N,N'-methylene-bis-acrylamide or hexahydro-1,3,5-triacryloyl-s-triazine.

3. A composition according to claim 1 in which the diameter is below 3,500 Å, the standard deviation is from 3 to 10%, and the surface area is above 10 m$^2$/g.

4. A composition according to claim 1 in which the vinyl pyridine is 4-vinyl pyridine and the cross-linking agent is N,N'-methylene-bis-acrylamide.

* * * * *